(12) United States Patent
Gröll et al.

(10) Patent No.: US 8,251,098 B2
(45) Date of Patent: Aug. 28, 2012

(54) SLIDE VANE FOR HYDRAULIC POWER STEERING

(75) Inventors: Stephan Gröll, Alfter (DE); Alexander Kogan, Köln (DE)

(73) Assignee: tedrive Holding B.V., NK Heerlen (NL)

( * ) Notice: Subject to any disclaimer, the term of this patent is extended or adjusted under 35 U.S.C. 154(b) by 1085 days.

(21) Appl. No.: 12/140,723

(22) Filed: Jun. 17, 2008

(65) Prior Publication Data

US 2008/0309083 A1    Dec. 18, 2008

(30) Foreign Application Priority Data

Jun. 18, 2007  (DE) .................. 10 2007 028 529

(51) Int. Cl.
*B62D 5/087* (2006.01)
*B62D 5/08* (2006.01)
(52) U.S. Cl. ............. 137/625.69; 137/625.25; 91/378; 180/422; 180/441
(58) Field of Classification Search ............ 137/625.25, 137/625.67, 625.68, 625.69; 91/374, 376 A, 91/376 R, 378; 180/421, 422, 441, 444
See application file for complete search history.

(56) References Cited

U.S. PATENT DOCUMENTS

| | | | | |
|---|---|---|---|---|
| 2,826,258 A | * | 3/1958 | Livers ...................... | 180/436 |
| 2,854,955 A | * | 10/1958 | Be Vier ..................... | 91/382 |
| 2,885,020 A | * | 5/1959 | Herbenar .................. | 180/429 |
| 3,587,646 A | * | 6/1971 | Adams ...................... | 137/625.68 |
| 3,763,951 A | * | 10/1973 | Kristof et al. ............ | 137/625.69 |
| 4,249,455 A | * | 2/1981 | Kervagoret .............. | 137/625.69 |
| 4,494,915 A | * | 1/1985 | White, Jr. ................ | 137/625.69 |
| 4,561,516 A | * | 12/1985 | Bishop et al. ............ | 180/422 |
| 5,427,134 A | | 6/1995 | Tiedman | |
| 5,771,932 A | * | 6/1998 | Cho et al. ................ | 137/625.69 |
| 2004/0211619 A1 | * | 10/2004 | Yoneda et al. .......... | 180/444 |

FOREIGN PATENT DOCUMENTS

| | | |
|---|---|---|
| DE | 69208261 | 8/1996 |
| DE | 19755633 | 6/1999 |
| DE | 102004034026 A1 | 2/2006 |

* cited by examiner

*Primary Examiner* — John Rivell
(74) *Attorney, Agent, or Firm* — Summa, Additon & Ashe, P.A.

(57) ABSTRACT

The invention relates to a slide vane (20) for a hydraulic power steering of automotive vehicles with a tubular control sleeve (24). Said control sleeve is connected to an output shaft (28) and comprises first control grooves (32) in its inner surface (34). Further, there is provided a tubular sliding sleeve (26) that is disposed at least in portions within said control sleeve (24). On its outer surface (38), the sliding sleeve (26) comprises second control grooves (36) that may be brought to coincide with the first control grooves (32) of the control sleeve (24), said first control grooves (32) being disposed substantially in the circumferential direction of the tubular control sleeve (24) and said second control grooves (36) substantially in the circumferential direction of said tubular sliding sleeve (26). The relative position of said control sleeve (24) and of said sliding sleeve (26) being relatively variable in the axial direction.

14 Claims, 2 Drawing Sheets

SLIDE VANE FOR HYDRAULIC POWER STEERING

CROSS-REFERENCE TO PRIORITY APPLICATION

This application hereby claims the benefit of the commonly assigned German Patent No. 10 2007 028 529.0 (filed Jun. 18, 2007), which is hereby incorporated by reference in its entirety.

FIELD OF THE INVENTION

The present invention relates to a slide vane for a hydraulic power steering of an automotive vehicle, with a tubular control sleeve that is connected to an output shaft and comprises first control grooves in its inner surface.

BACKGROUND

Slide vanes, more specifically rotary slide vanes, are known and utilized by default in hydraulic power steering. These slide vanes control the hydraulic pressure and, as a result thereof, the steering assistance on an assistance cylinder as a function of the steering torque applied by the driver. In most cases, rotary slide vanes are utilized wherein an input shaft connected to a steering wheel via a steering column rotates relative to a control sleeve that is connected to the output shaft and to a steering pinion in the case of rack steering. Through a torsion system between the input shaft and the control sleeve, a torque-dependent angle of rotation of the vane and, as a result thereof a torque-dependent vane characteristic line, are realized. Accordingly, the rotation of the input shaft relative to the control sleeve serves to determine the assistance force needed for steering.

Rotary slide vanes for auxiliary force steering usually contain two vane elements that are disposed for coaxial movement inside each other and for limited rotational movement relative to each other for achieving a control path. Accordingly, the input shaft can be connected to a first vane element configured to be a rotary slide vane located radially inside. The control sleeve is radially disposed outside of, and surrounds, the first vane element. Both vane elements comprise control grooves that extend axially along at least a portion of the vane elements. The control grooves serve to control or move a pressure means from or toward working spaces of a hydraulic actuating power unit or servo motor. The control grooves however may also be disposed directly on the input shaft.

Such type rotary vanes are described in DE 10 2004 034 026 A1, DE 692 08 261 T2 and DE 197 55 633 A1 for example.

For flawless function of the rotary slide vane, precise manufacturing of the control edges and the control grooves is absolutely necessary. By designing the control edges accordingly, the opening cross section of the rotary slide vane can be dictated as a function of the angle of rotation between the vane elements. For this reason, manufacturing of the control edges requires complex and cost-intensive manufacturing methods. It is precisely the manufacturing of the control grooves running in the axial direction, in particular also described in the printed documents mentioned, that involves considerable expense. In particular the longitudinal grooves of the control sleeve, which lie inside, place increased demands on the manufacturing process. For example, the control grooves are manufactured by scraping and milling, whilst the corresponding geometry of the control edges is provided by stamping and grinding.

Another disadvantage of known rotary slide vanes is that they do not allow for implementing certain functionalities comprising electrically assisted power steering using hydraulically assisted power steering. This applies for example to functions in which the steering torque is not applied by the driver but by an electric motor. Such a functionality is for example needed for realizing parking assistance systems wherein the vehicle is parked automatically without the driver having to apply a steering torque. Applying a steering torque is hardly possible or only at considerable expense using a hydraulically assisted system having the described rotary slide vanes.

SUMMARY OF THE INVENTION

It is the object of the present invention to provide a slide vane that remedies the disadvantages associated with the prior art. In particular, said slide vane should reduce the manufacturing costs associated with known slide vanes and allow for additional functionalities as compared to the known rotary slide vanes. For example, the rotary slide vane will permit the application of a steering torque by means of an auxiliary motor.

In accordance with the invention, this object is solved by a slide vane for the hydraulic power steering of automotive vehicles, wherein the slide vane comprises a tubular control sleeve and a tubular sliding sleeve. The tubular control sleeve is connected to an output shaft and comprises first control grooves in its inner surface. The tubular sliding sleeve is disposed within at least a portion of the control sleeve. The tubular sliding sleeve comprises second control grooves on its outer surface that may be brought to coincide or correspond with the first control grooves of the control sleeve.

The first control grooves are disposed in the circumferential direction of the tubular control sleeve and the second control grooves are disposed in the circumferential direction of the tubular sliding sleeve. The relative position of the control sleeve and sliding sleeve being relatively variable in the axial direction along a longitudinal axis.

Accordingly, there is provided, in accordance with the invention, control grooves disposed in the circumferential direction of the control sleeve and sliding sleeve, or the input shaft and output shaft, as opposed to the longitudinal direction of the subject sleeves and shafts. The circumferential disposition of the control grooves with respect to the control sleeve and sliding sleeve, or the input shaft and output shaft offers the major advantage that all of the control grooves may be manufactured using a low-cost turning process.

The control grooves are moveable to coincide or not to coincide with respect to one another since the relative position of the control sleeve and the sliding sleeve is variable in the axial direction. The relative positioning of the control sleeve and sliding sleeve, and hence the relative positioning of the control grooves, with respect to one another, is possible through various suited arrangements. One such practicable embodiment capable of being manufactured at low cost being described hereinafter by way of example only.

In one embodiment, the control sleeve is fixedly connected to an output shaft in the axial direction, meaning it cannot be displaced. The sliding sleeve, by contrast, is capable of sliding relative to the input shaft and, as a result thereof, also relative to the control sleeve, so that the control grooves can be brought in the desired relative position. In order to ensure such relative positioning, the sliding sleeve comprises an inclined groove having a gradient angle α with respect to a longitudinal axis of the slide vane. A pressure element fixedly connected to the input shaft engages this inclined groove. The pressure element may be in the form of a pin, a pintle, a finger, or any such projecting member capable of engaging the inclined groove.

If, through a torque applied, the input shaft is now rotated relative to the control sleeve, the pressure element exerts a force onto the sliding sleeve via the inclined groove, said sliding sleeve being displaced in the axial direction as a result thereof.

In order to ensure precise motion of the sliding sleeve, said sliding sleeve may comprise an additional groove running in the axial direction into which projects a guide element of the control sleeve, such as a pin. That said, the guide element may be in the form of any such projecting member capable of engaging the additional groove. As a result, the sliding sleeve is guided securely and very precisely with respect to the control sleeve.

The slide vane of the invention is particularly well suited for applying a steering torque, for example a pinion drive 50, directly onto the steering train without using the steering wheel. As used herein with reference to the subject invention, the phrase "a steering torque drive" refers to an assembly other than a steering wheel-that is capable of applying a force to a steering train (e.g., an adjusting motor in the form of pinion drive/adjusting motor 50). The control sleeve and the sliding sleeve need only be displaced relative to each other. With means that are quite simple in terms of construction, an adjusting motor 50 can be mechanically connected to the pressure element projecting into the inclined groove such that the adjusting motor displaces the pressure element. Accordingly, the slide vane allows for a functionality that is usually hard to achieve with hydraulic power steering. What are termed parking assistance systems can be readily realized.

The invention will be better understood upon reading the following description of the figures, it being again noted that it only describes an advantageous implementation variant.

DETAILED DESCRIPTION

Figure 1:
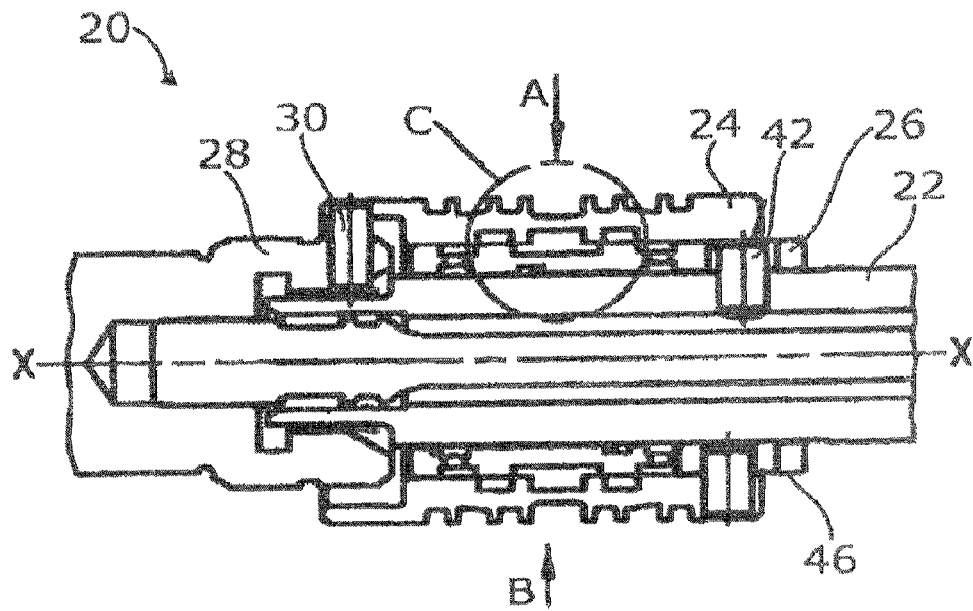
FIG. 1 illustrates a longitudinal section view of a slide vane of the invention.
Figure 2:
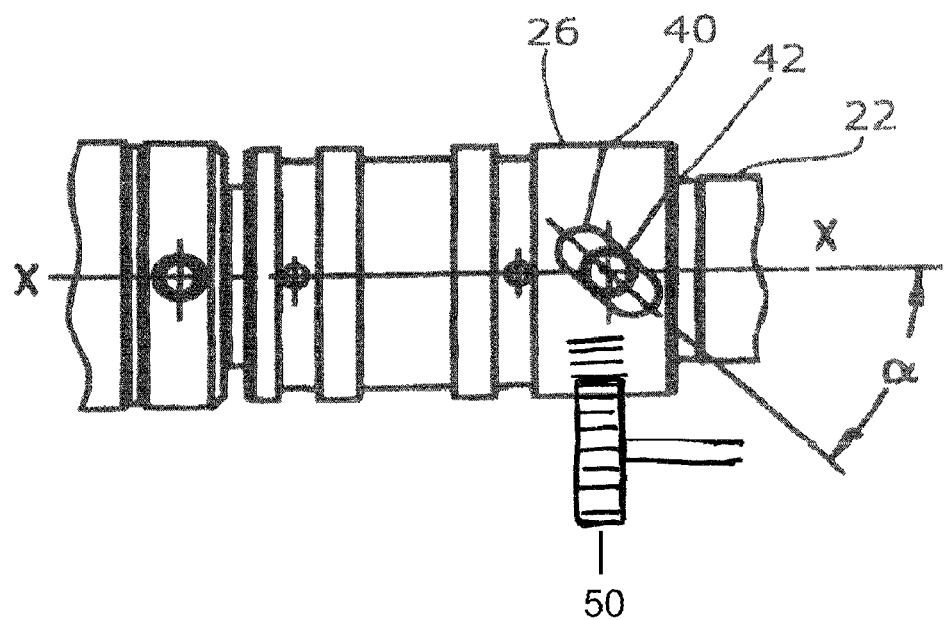
FIG. 2 depicts the vane in view A without the control sleeve.
Figure 3:
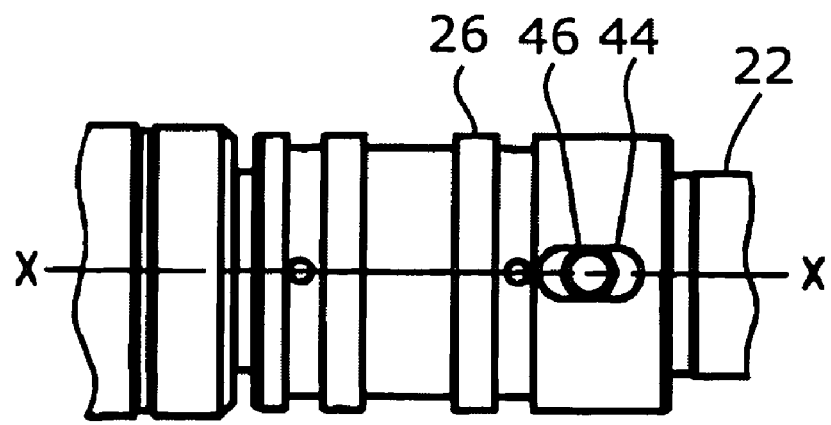
FIG. 3 illustrates the vane in view B without the control sleeve.

FIG. 1 shows a slide vane 20 of the invention that comprises a sliding sleeve 26 positioned between an input shaft 22 and a control sleeve 24. Said control sleeve 24 and the sliding sleeve 26 are of a tubular configuration, the sliding sleeve 26 being located substantially within the control sleeve 24. The input shaft 22 is connected to a steering wheel via a longitudinal column (not illustrated), whereas the control sleeve 24 is non-rotatably fastened to an output shaft 28. Said output shaft 28 is in turn indirectly connected to wheels that are to be rotated.

In the exemplary embodiment shown, the control sleeve 24 is fastened to the output shaft 28 via a pin 30.

The sliding sleeve 26 is movable in an axial direction along a longitudinal axis x-x of the slide vane 20. As a result, displacement or movement of the sliding sleeve may position the second control grooves 36, which are defined by an outer surface 38 of the sliding sleeve 26, to coincide or cooperate with the first control grooves 32, which are defined by an inner surface 34 of the control sleeve 24. In other words, the sliding sleeve 26 may be axially displaced such that at least one of the second control grooves 36 is in communication with at least one of the first control grooves 32 (i.e., an open position). Similarly, the sliding sleeve 26 may be axially displaced such that communication between at least one of the second control grooves 36 and at least one of the first control grooves 32 is prevented (i.e., a closed position). If the control grooves 32, 36 coincide to form an open position, then a hydraulic liquid flows there through into a module assisting the longitudinal force (not shown).

In order to ensure that a torque applied to the input shaft controls the slide vane 20, said slide vane is connected to the input shaft 22 through an inclined groove 40 and a pressure element 42 projecting into said groove. The inclined groove 40 comprises a gradient angle α which is about 45° in the exemplary embodiment shown. Said gradient angle α however may be any angle and can be chosen freely, in particular so as to meet the corresponding general conditions, but should not exceed 45° in order to prevent the moving parts from self locking. The pressure element 42 is fixedly connected to the input shaft 22 and drives the sliding sleeve 26 along the longitudinal axis x-x of the slide vane 20 when the input shaft 22 is rotated with respect to the control sleeve 24.

A longitudinal groove 44 within the sliding sleeve 26 ensures that the sliding sleeve 26 is always displaced on the input shaft 22 with precise guidance. For this purpose, a guide element 46, which is fixedly connected to the control sleeve 24, extends through the longitudinal groove 44.

Figure 4:
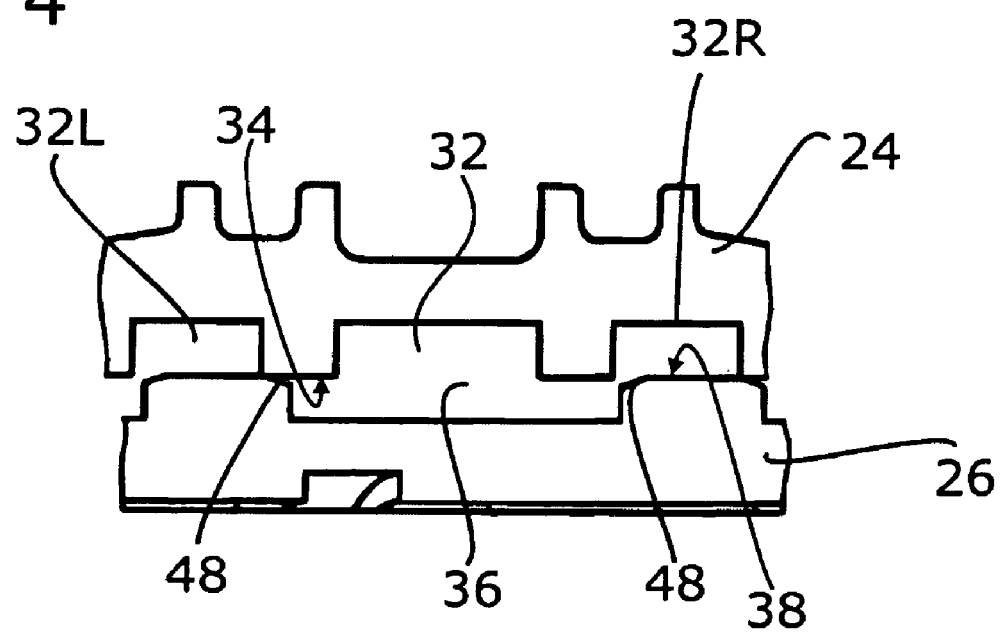
FIG. 4 depicts an enlarged detail (C) of FIG. 1 illustrating more clearly the control grooves and the control edges.

FIG. 4 clearly shows once more the cooperation of the control grooves 32, 36. The left first control groove 32L shown is closed (i.e., not in communication with a second control groove 36), while the right first control groove 32R is open (i.e., coincides with or is in communication with a second control groove 36). Control edges 48 can be seen, which are intended to ensure a certain desired steering assistance behavior. This assistance behavior is achieved by the bevel of the control edges 48.

The invention is not limited to the exemplary embodiment shown, other implementation possibilities are envisageable instead. More specifically, the slide vane 20 can be connected to a steering torque drive that has not been illustrated herein and that replaces a manual torque otherwise applied by a driver. Such assistance may, for example, be applied to the pressure element 42 although here again any other connection with the sliding sleeve 26 in particular is conceivable. In such a case, it would only be necessary to make some adjustments in terms of construction.

The invention claimed is:

1. A slide vane (20) for a hydraulic power steering of automotive vehicles, said slide vane comprising:
   a tubular control sleeve (24) that is connected to an output shaft (28) and comprises first control grooves (32) in its inner surface (34);
   a tubular sliding sleeve (26) that is disposed at least in portions within said control sleeve (24), said sliding sleeve comprises on its outer surface (38) second control grooves (36) that may be brought to coincide with the first control grooves (32) of the control sleeve (24);
   said first control grooves (32) being disposed substantially in the circumferential direction of the tubular control sleeve (24) and said second control grooves (36) substantially in the circumferential direction of said tubular sliding sleeve (26) and the relative position of said control sleeve (24) and of said sliding sleeve (26) being relatively variable in the axial direction along a longitudinal axis x-x.

2. The slide vane (20) as set forth in claim 1, wherein the sliding sleeve (26) comprises an inclined groove (40) into which projects a pressure element (42) that is fixedly connected to an input shaft (22).

3. The slide vane (20) as set forth in claim 2, wherein the pressure element (42) is configured to be a pin.

4. The slide vane (20) as set forth in claim 1, wherein the sliding sleeve (26) comprises a longitudinal groove (44) into which projects a guide element (46) that is fixedly connected to the control sleeve (24).

5. The slide vane (20) as set forth in claim 2, wherein the inclined groove (40) is at a gradient angle (a) of about 10° to 45° with respect to the longitudinal axis x-x.

6. The slide vane (20) as set forth in claim 5, wherein the gradient angle ($\alpha$) is 45°.

7. The slide vane (20) as set forth in claim 1, wherein the change in the relative position of the control sleeve (24) and of the sliding sleeve (26) is effected by a steering torque drive and in one embodiment a pinion drive 50.

8. The slide vane (20) as set forth in claim 7, wherein the steering torque drive is an external motor in the form of a pinion drive 50 that applies a force onto the pressure element (42).

9. A slide vane (20) for use in connection with a hydraulic power steering assembly of an automotive vehicle, said slide vane comprising:
   a tubular control sleeve (24) connected to an output shaft (28) of the power steering assembly, said tubular control sleeve having an inner surface (34) that defines first control grooves (32); and
   a tubular sliding sleeve (26) disposed within at least a portion of said control sleeve (24), said tubular sliding sleeve having an outer surface (38) that defines second control grooves (36), said tubular sliding sleeve moveable in an axial direction along a longitudinal axis x-x defined by said slide vane;
   wherein said first and second control grooves (32, 36) are positioned substantially adjacent to one another such that axial movement of said sliding sleeve (26) promotes communication between at least one of said first control grooves (32) and at least one of said second control grooves (36).

10. A slide vane (20) as set forth in claim 9, wherein:
   said first control grooves (32) are positioned in a substantially circumferential direction about said inner surface (34) of said tubular control sleeve; and
   said second control grooves (36) are positioned in a substantially circumferential direction about said outer surface of said tubular sliding sleeve (26).

11. A slide vane (20) as set forth in claim 9, wherein the position of said control sleeve (24) and said sliding sleeve (26) with respect to one another is relatively variable in the axial direction along the longitudinal axis x-x defined by said slide vane.

12. A slide vane (20) for use in connection with a hydraulic power steering assembly of an automotive vehicle, said slide vane comprising:
   a tubular control sleeve (24) connected to an output shaft (28) of the power steering assembly, said tubular control sleeve having an inner surface (34) that defines first control grooves (32), said first control grooves (32) positioned circumferentially about said inner surface (34) of said tubular sleeve; and
   a tubular sliding sleeve (26) disposed within at least a portion of said control sleeve (24), said tubular sliding sleeve having an outer surface (38) that defines second control grooves (36), said second control grooves (36) positioned circumferentially about said outer surface of said tubular sliding sleeve (26);
   wherein said sliding sleeve is moveable in an axial direction along a longitudinal axis x-x defined by said slide vane.

13. A slide vane (20) as set forth in claim 12, wherein said first and second control grooves (32, 36) are positioned substantially adjacent to one another such that axial movement of said sliding sleeve (26) promotes communication between at least one of said first control grooves (32) and at least one of said second control grooves (36).

14. A slide vane (20) as set forth in claim 12, wherein the position of said control sleeve (24) and said sliding sleeve (26) with respect to one another is relatively variable in the axial direction along the longitudinal axis x-x defined by said slide vane.

* * * * *